United States Patent [19]

Walker

[11] Patent Number: 4,860,694

[45] Date of Patent: Aug. 29, 1989

[54] CONTROLLED DISCHARGE FROM A STANDPIPE CONTAINING PARTICULATE MATERIALS

[75] Inventor: David J. Walker, Wadsworth, Ohio

[73] Assignee: The Babcock & Wilcox Company, New Orleans, La.

[21] Appl. No.: 242,656

[22] Filed: Sep. 12, 1988

[51] Int. Cl.⁴ .............................................. F22B 1/00
[52] U.S. Cl. .................................. 122/4 D; 110/245; 165/104.16; 422/145
[58] Field of Search ...................... 122/4 D; 110/245; 165/104.16; 431/7, 170; 422/139, 145

[56] References Cited

U.S. PATENT DOCUMENTS

| 4,469,050 | 9/1984 | Korenberg | 122/4 D |
| 4,709,663 | 12/1987 | Larson et al. | 122/4 D |
| 4,813,479 | 3/1989 | Wahlgren | 122/4 D X |

Primary Examiner—Edward G. Favors
Attorney, Agent, or Firm—Robert J. Edwards; Michael L. Hoelter

[57] ABSTRACT

A system for the control and conveyance of particulate material from a standpipe to the furnace of a circulating fluidized bed boiler. Aeration means positioned in a first area of a conduit transports particulate material deposited by a standpipe to a second area of the conduit. Upon such relocation, additional material from the standpipe enters the first area of the conduit as a replacement for the previously removed material. Fluidizing means in the second area of the conduit fluidizes this removed material causing it to achieve a generally uniform level within this second area. As the height of this level exceeds that of the lower edge of a discharge opening, the fluidized material passes through this opening and into the furnace of a circulating fluidized bed boiler.

18 Claims, 2 Drawing Sheets

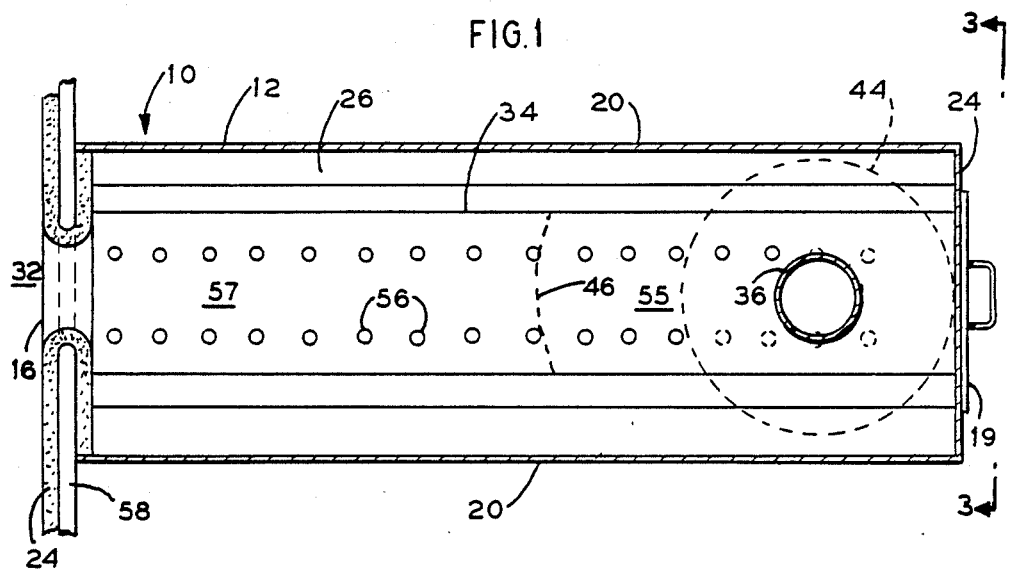

CONTROLLED DISCHARGE FROM A STANDPIPE CONTAINING PARTICULATE MATERIALS

FIELD OF THE INVENTION

This invention pertains to circulating fluidized bed boilers and more particularly to an improvement in the transportation of particulate material from a standpipe to the fluidizing chamber or furnace of the boiler.

BACKGROUND OF THE INVENTION

In circulating fluidized bed boilers, fly ash, limestone and other particulate materials become entrained in the flue gas. These hot materials are later separated out from the flue gas and are collected in a storage hopper for subsequent recycling via a standpipe back to the fluidizing chamber or furnace of the boiler.

When the temperature of these particulate materials changes rapidly, or when the flow rate is resumed after a period long enough to allow them to cool down, extremely high temperature transients occur in the conduit from the standpipe to the furnace. Also, during normal operation, this mix of particulate material flows somewhat horizontally in the conduit from the standpipe to the furnace. Consequently, the bulk of the flow occurs along the top of the conduit while the solids along the bottom are essentially stagnant, moving very slowly and intermittently or not at all. This phenomenon is inherent in that two substances with greatly different densities are being conveyed; solids, such as sand or limestone, and gas, such as air or flue gas. The effect of such stagnation at the lower part of the horizontal conduit occurs more significantly at lower flow rates and can occur at all flow rates depending on specific conditions. This stagnation and the corresponding extreme temperature differentials which occur results in a deterioration of the conduit itself.

In many boilers, it is common to use a non-mechanical valve or a controlled particulate discharge valve intermediate the particle storage hopper and the furnace to control the flow of the particulate materials. Such a valve uses a small amount of measured air to control these particles. Furthermore, for proper operation this type of valve also requires a length of horizontal conduit long enough to at least stop the flow of the particulate materials when aeration control is shut off. However, this length cannot be too long since an excessive length only increases flow resistance thereby reducing the maximum volume of flow attainable. Generally, an ideal length is one slightly longer than the normal angle of repose of the particulate materials being conveyed.

It is thus an object of this invention to provide an improved means for conveying recycled particulate materials within a circulating fluidized bed boiler. Another object of this invention is to keep the recycled particles at a uniform temperature within the horizontal conduit thereby avoiding the problems associated with extreme temperature differentials. A further object of this invention is to free the relationship of horizontal transport distance and maximum solids flow capacity. Still another object of this invention is to provide a means for discharging a known quantity of particles into the furnace. Yet another object of this invention is to create a recycling rate which is self-compensating i.e., the greater the flow of particulate materials, the greater the discharge of these particulates into the furnace. These and other objects will become apparent upon further investigation of this invention.

SUMMARY OF THE INVENTION

This invention pertains to the control and conveyance of particulate materials from a standpipe in a circulating fluidized bed boiler. It incorporates a pressurized, high temperature conduit which has a particulate entrance and one or more side discharge openings that open onto the furnace of the circulating fluidized bed boiler. A standpipe projects into this conduit through the particulate entrance and this standpipe deposits the particulate materials into a first area of the conduit. Upon being so deposited, the particulate materials conform to a specific at-rest angle of repose within the pressurized conduit. Aeration means in the first area of this conduit aerates the deposited particulate material thereby decreasing its flow resistance and causing it to move to a second area of the conduit. Upon being so moved, additional particulate material from the standpipe enters the first area as a replacement for the material moved into the second area. Fluidizing means in the second area of the conduit fluidizes the material moved into this area and transports it along the conduit toward at least one side discharge opening. The mix of material fluidized in this second area of the conduit has a generally uniform height throughout, consequently, when its height is sufficient enough to pass through the side discharge openings, the particulate materials pour into the furnace of the circulating fluidized bed boiler. The rate of such departure into the furnace is dependent upon the height of this material above the lower edge of the side discharge openings. This rate is also dependent upon the rate at which the particulate materials are moved from the first area of the conduit to the second area.

BRIEF DESCRIPTION OF THE DRAWINGS

FIG. 1 is a top pictorial view of the conduit showing the standpipe and a single side discharge opening.

FIG. 2 is a front pictorial view of the conduit showing the aeration and fluidizing assemblies.

DETAILED DESCRIPTION OF THE DRAWINGS

Figure 3:
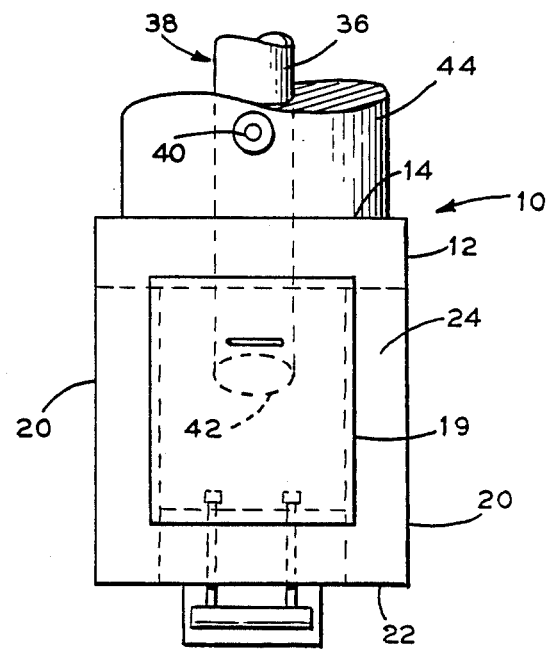
FIG. 3 is a side pictorial view of the conduit showing the access door.

Referring to the drawings, there is shown a portion of circulating fluidized bed boiler 10. In particular, generally horizontal conduit 12 is illustrated having top entrance opening 14, at least one side discharge opening 16 and access opening 17 with cover door 19. Conduit 12 is shown as being rectangular but any other shape, such as circular or triangular, is equally suitable. The top 18, walls 20, bottom 22 and ends 24 of conduit 12 are refractory lined and/or insulated 26 from the heat of particulate material 28, flue gas 30 and furnace 32. The interior cavity 34 of conduit 12 is pressurized, thus conduit 12 is constructed so as to prevent any pressure loss.

Hot particulate material 28 and sometimes flue gas 30 enter conduit 12 via standpipe 36 which extends through entrance opening 14. Material 28 is composed of the solid particles (limestone, ash, said, coal, etc.) removed from flue gas 30 and stored in a particle storage hopper (not shown). Standpipe 36 is connected directly to particle storage hopper and it forms a part of a non-mechanical valve or controlled particulate discharge valve 38. An optional aeration assist connection 40, also a part of nonmechanical valve 38, is secured to standpipe 36 a few diameters up from discharge end 42 of standpipe 36. Aeration assist connection 40 is oftentimes used to inject a measured amount of air into standpipe 36 to assist the flow of particulate material 28 through standpipe 36. Both standpipe 36 and aeration assist connection 40 are insulated as well as being protected by casing 44. As can be surmised, enterance opening 14 is sealed against any pressure loss from within conduit 12.

Particulate material 28 travels through standpipe 36 and enters first area 55 of cavity 34. As particulate material 28 comes to rest on bottom 22, it forms a conical mound 46 (as best it can within the confines of cavity 34) having a specific at rest angle of repose. Once mound 46 if formed, (its pinnacle being at discharge end 42 of standpipe 36) no further material 28 can enter first area 55 of cavity 34 until portion of mound 46 is conveyed elsewhere such as to second area 57 of cavity 34.

Extending through bottom 22 is air supply assembly 48 incorporating a series of spaced tubes 50. A first portion 51 of tubes 50 extend into first area 55 of cavity 34 and are connected to headers 52. A second or the remaining portion 53 of tubes 50 extend into second area 57 of cavity 34 and are connected to air plenum 54. Headers 52 and air plenum 54 are each separately controllable such that the different areas of cavity 34 are separately controllable. This ability to control first portion 51 of tubes 50 separate from second portion 53 enables first portion 51 to simply aerate mound 46 while second portion 53 can actually fluidize the particles in second area 57 of cavity 34.

For true fluidization, the velocity of the fluidizing medium must exceed the minimum fluidizing velocity of particulate material 28. When material 28 is fluidized, it will have a generally horizontal upper surface level. However, when the fluidizing medium is introduced into cavity 34 at a rate less than that required for true fluidization, particulate material 28 is said to be aerated causing it to gradually lose its resistance to flow. In this manner, as first portion 51 of tubes 50 aerates first area 55 of cavity 34, and as this aeration flow increases, the edge of mound 46 becomes undermined. Consequently, this portion of mound 46, which now has low flow resistance, is moved at an increasing rate towards and into second area 57 of cavity 34 where it is fluidized by second portion 53 of tubes 50. In some cases where resistance to flow is high, the aeration flow rate may approach or even exceed the minimum fluidizing velocity in order to induce flow from the standpipe. Additionally, the individual headers supplying first portion 51 of tubes 50 may also be individually controlled to vary the aeration in first area 55 of cavity 34 underneath mound 46.

It should be noted that the fluidizing medium used for both fluidization and aeration may be recycled flue gas or it may be pressurized air depending on the design parameters of circulating fluidized bed boiler 10. Regardless of the fluidizing medium, all of tubes 50 have bubble caps 56 at their upper end, this end projecting slightly into cavity 34.

As illustrated in the drawings, tubes 50 are positioned along the entire length of conduit 12 with first portion 51 concentrated in first area 55 of conduit 12 underneath conical mount 46 and with second portion 53 positioned in second area 57 of conduit 12. In this way, as particulate material 28 piles up within first area 55, they are tumbled or aerated by the fluidizing medium coming from closely spaced first portion 51 of tubes 50. Such tumbling or aeration undermines mound 46 causing particulate material 28 to travel towards second area 57 of conduit 12 where they are fluidized by second portion 53 of tubes 50. As material 28 is conveyed away from mound 46, more material enters cavity 34 from standpipe 36. Second portion 53 fluidized this relocated material and eventually material 28 in second area 57 reaches a common level 59 within cavity 34 while being conveyed towards side discharge opening 16.

Side discharge opening 16 (of which there may be more than one) opens into furnace 32 through membrane wall 58. The bottom of opening 16 is elevated above bottom 22 of conduit 12 thereby enabling opening 16 to act like a weir. In this fashion, the flow of particulate material 28 out of conduit 12 and into furnace 32 can be easily controlled by controlling the amount and pressure of the fluidizing medium in second area 57. The greater the fluidizing medium, the higher level 59 of the bubbling bed which, in turn, causes more particulate material 28 to spill or flow into furnace 32.

During operation, particulate material 28 is removed from the flue gas and stored in a particle storage hopper. Standpipe 36 connects to this hopper and drains material 28 into conduit 12 such as by using aeration assist connection 40. Particulate material 28 mounds inside cavity 34 and it is desired to transport this material, in a controlled manner, through end discharge opening 16 and into furnace 32. Due to the natural angle of repose of particulate material 28, this material will only extend a certain distance within conduit 12 before coming to rest despite the pressure in standpipe 36. To transport this material further, a pressurized fluidizing medium is injected into first area 55 of cavity 34 underneath mound 46 thereby aerating and undermining it. This fluidized material 28 is then transported to second area 57 of cavity 34 where it is fluidized by second portion 53 of tubes 50. As mound 46 is dispersed, more material 28 enters first area 55 of cavity 34 from standpipe 36. Simultaneously, the material previously conveyed to second area 57 of cavity 34 is uniformly dispersed within second area 57 until common level 59 is reached.

As level 59 rises above the bottom of side discharge opening 16, the particulate material 28 above this edge spills over or flows into furnace 32. To increase or decrease the amount fed into furnace 32, the level of particulate material 28 within conduit 12 is controlled by varying the rate and volume of the fluidizing medium injected into conduit 12. Of course, all of this occurs with sufficient enough pressure to overcome the pressure within furnace 32 yet with not so great a pressure that particulate material 28 can no longer flow from standpipe 36 into cavity 34.

What is claimed as invention is:

1. An apparatus for the control and conveyance of particulate material from a standpipe in a circulating fluidized bed boiler comprising:
   (a) a pressurized, high temperature conduit having a particulate entrance and at least one side discharge opening that opens onto the furnace of said circulating fluidized bed boiler;
   (b) a standpipe projecting through said particulate entrance a set distance, said standpipe depositing said particulate material into a first area of said conduit, said particulate material having a specific at-rest angle of repose within said pressurized conduit and forming, as best it can, a generally conical mound in said conduit, the apex of said mound being at the discharge end of said standpipe;

(c) aerating means underneath said first area of said conduit for aerating and moving said conically deposited particulate material from said first area to a second area of said conduit beyond said first area, said moved particulate material being replaced with additional particulate material deposited into said first area from said standpipe; and (d) fluidizing means underneath said second area of said conduit for fluidizing said moved particulate material and for transporting said now fluidized material along said conduit toward said side discharge opening, said fluidized and transported particulate material having a generally uniform height in said second area, said height being less than the height of said conduit;

(e) whereby said fluidized and transported particulate material departs said conduit through said side discharge opening into said furnace of said circulating fluidized bed boiler with the rate of said departure being dependent upon the height of said particulate material in said second area above the lower edge of said side discharge opening, said rate of departure also being dependent upon the rate at which said particulate material is moved form said first area of said conduit to said second area.

2. The apparatus as set forth in claim 1 wherein said first area of said conduit is defined as that portion covered by said particulate material when said particulate material is at rest at its natural specific angle of repose within said conduit underneath said standpipe means.

3. The apparatus as set forth in claim 2 wherein said aerating and fluidizing means are separately supplied thereby enabling each said means to be separately controlled.

4. The apparatus as set forth in claim 3 wherein said aerating means comprise a plurality of headers each separately controllable for supplying an aerating medium to said first area of said conduit.

5. The apparatus as set forth in claim 4 wherein said fluidizing means comprises an air plenum uniformly supplying a fluidizing medium to said second area of said conduit.

6. The apparatus as set forth in claim 5 wherein said aerating and fluidizing means each comprise a multitude of spaced fluidizing tubes with said tubes of said aerating means being spaced equal to or closer together than said tubes of said fluidizing means.

7. The apparatus as set forth in claim 6 wherein said conduit is elongated, insulated and generally rectangular and wherein said side discharge opening acts as a weir to calibrate the flow of said particulate material through said side discharge opening.

8. The apparatus as set forth in claim 7 wherein there are multiple side discharge openings.

9. The apparatus as set forth in claim 7 wherein said standpipe is insulated and includes aeration assist means secured to said standpipe for assisting the flow of said particulate material through said standpipe.

10. A method for controlling and conveying particulate material from a standpipe in a circulating fluidized bed boiler comprising:

(a) containing and flowing said particulate material in and through a standpipe;

(b) depositing said particulate material into a first area of a pressurized, high temperature conduit, said material having a specific at-rest angle of repose within said first area of said conduit and forming, as best it can, a generally conical mound in said conduit, the apex of said mound being at the discharge end of said standpipe;

(c) aerating from underneath said conically mounded particulate material deposited in said first area of said conduit;

(d) conveying a portion of said aerated material to a second area of said conduit beyond said first area;

(e) replacing said conveyed material with additional material conically deposited into said first area from said standpipe;

(f) fluidizing from underneath said conveyed material in said second area of said conduit, said conveyed material achieving a generally uniform level within said second area the height of said level being less than the height of said conduit;

(g) transporting said now fluidized material in said second area of said conduit toward at least one side discharge opening, said side discharge opening having a know area; and, (h) raising the level of said fluidized material in said second area above the lower elevation of said side discharge opening for subsequent discharge into the furnace of said circulating fluidized bed boiler.

11. The method as set forth in claim 10 wherein said first area of said conduit is defined as that portion covered by said particulate material when said particulate material is at rest at its natural specific angle of repose within said conduit underneath said standpipe.

12. The method as set forth in claim 11 wherein said aerating and fluidizing steps are each separately supplied thereby enabling each said step to be separately controlled.

13. The method as set forth in claim 12 wherein the step of aerating said particulate material in said first area is accomplished by a plurality of headers each separately controllable for supplying an aerating medium to said first area of said conduit.

14. The method as set forth in claim 13 wherein the step of fluidizing said conveyed material in said second area is accomplished by an air plenum uniformly supplying a fluidizing medium to said second area of said conduit.

15. The method as set forth in claim 14 wherein said aerating fluidizing steps comprise a plurality of spaced fluidizing tubes with said tubes aerating said first area being spaced equal to or closer together than said tubes fluidizing said second area.

16. The method as set forth in claim 15 wherein said conduit is elongated, insulated and generally rectangular and wherein said side discharge opening acts as a weir to calibrate the flow of said particulate material through said side discharge opening.

17. The method as set forth in claim 16 wherein there is a plurality of side discharge openings.

18. The method as set forth in claim 17 wherein said standpipe comprises aeration assist means secured to said standpipe for assisting the flow of said particulate material through said standpipe.

* * * * *